(12) United States Patent
Yoshida

(10) Patent No.: US 11,789,377 B2
(45) Date of Patent: Oct. 17, 2023

(54) OPTICAL SCANNING DEVICE AND IMAGE FORMING APPARATUS

(71) Applicant: KYOCERA Document Solutions Inc., Osaka (JP)

(72) Inventor: Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/995,655

(22) PCT Filed: Jan. 28, 2022

(86) PCT No.: PCT/JP2022/003372
§ 371 (c)(1),
(2) Date: Oct. 6, 2022

(87) PCT Pub. No.: WO2022/181208
PCT Pub. Date: Sep. 1, 2022

(65) Prior Publication Data
US 2023/0138292 A1  May 4, 2023

(30) Foreign Application Priority Data
Feb. 24, 2021 (JP) .................... 2021-027449

(51) Int. Cl.
*G03G 15/04* (2006.01)
*G02B 13/00* (2006.01)
*G02B 26/08* (2006.01)
*G02B 26/10* (2006.01)

(52) U.S. Cl.
CPC .... *G03G 15/04036* (2013.01); *G02B 13/0005* (2013.01); *G02B 26/0875* (2013.01); *G02B 26/10* (2013.01)

(58) Field of Classification Search
CPC .......... G03G 15/04036; G02B 13/0005; G02B 26/0875; G02B 26/10; G02B 26/123
USPC ....................................................... 399/216
See application file for complete search history.

(56) References Cited

FOREIGN PATENT DOCUMENTS

JP         3869704 B2 *  1/2007  .......... G02B 26/123
JP      2009-222863 A    10/2009

* cited by examiner

*Primary Examiner* — Quana Grainger
(74) *Attorney, Agent, or Firm* — Studebaker & Brackett PC

(57) ABSTRACT

An optical scanning device (15) includes a reference light guide part (50); a sub-light guide part (40); a reference holding structure (53) which includes a reference reception part (55) configured so as to be in contact with the reference lens (52) deflected in a sub-scanning direction; a sub-holding structure (45) which includes a sub-reception part (45) configured so as to be in contact with the sub-lens (42) deflected in the sub-scanning direction, wherein a deflection direction of the reference lens (52) coincides with a deflection direction of the sub-lens (42), and when it is assumed that the reference lens (52) and the sub-lens (42) are not deflected, an absolute value of a smallest distance between the sub-reception part (45) and the sub-lens (42) is set to be equal to or larger than an absolute value of a smallest distance between the reference reception part (55) and the reference lens (52).

8 Claims, 13 Drawing Sheets

FIG. 1
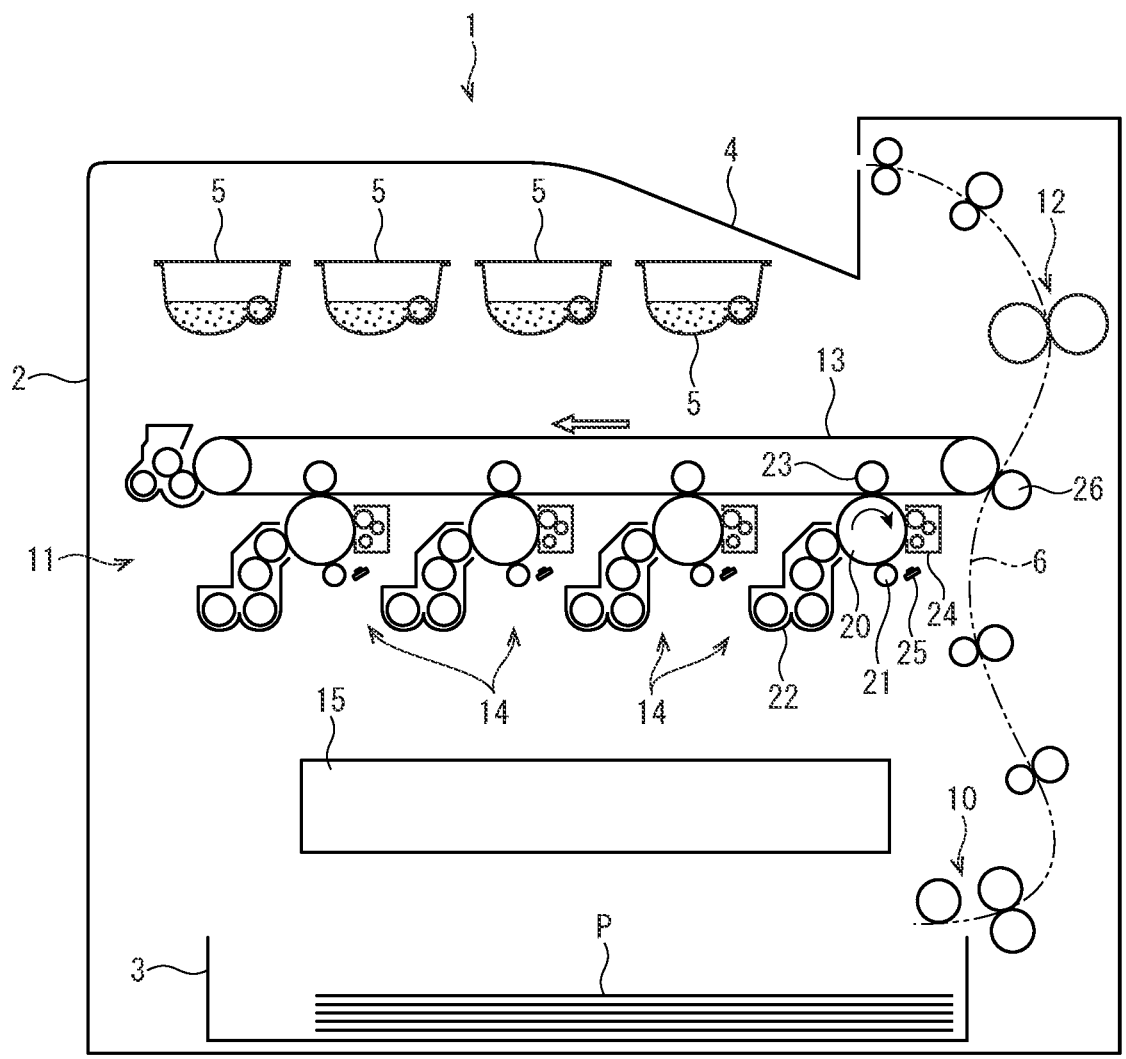
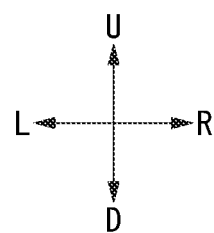

OPTICAL SCANNING DEVICE AND IMAGE FORMING APPARATUS

TECHNICAL FIELD

The present invention relates to an optical scanning device which exposes a plurality of image carriers and an image forming apparatus.

BACKGROUND

In an electrophotographic image forming apparatus, an optical scanning device which exposes a plurality of photosensitive drums (image carriers) is known (Patent Document 1). The optical scanning device is provided with an adjustment part which corrects a deflection (bow) of a scanning line on the photosensitive drum. When an adjustment screw is screwed in the adjustment part to deflect a second lens in a bow shape, the bow is corrected.

PRIOR ART DOCUMENTS

Patent Documents

Japanese Unexamined Patent Application Publication No. 2009-222863

SUMMARY OF THE INVENTION

Problems to be Solved by the Invention

The corrected deflection (deformation) of the second lens is changed (creep change) with the elapse of time due to a so-called creep phenomenon. The deformation amount of the second lens due to the creep phenomenon increases as the adjustment amount of the second lens increases.

In order to prevent the creep deformation, for example, the second lens may be held by a holder having a strength capable of resisting the creep deformation. However, when the holder having a high strength is used, another problem occurs such as an increase in manufacturing cost and an increase in the size of the apparatus.

The present invention provides an optical scanning device capable of reducing the creep deformation and an image forming apparatus in consideration of the above circumstances.

Means of Solving the Problems

An optical scanning device on the present invention is an optical scanning device which exposes a plurality of photosensitive drums. The optical scanning device includes a housing provided with a light source; a reference light guide part which includes at least one reflection mirror and guides light emitted from the light source and passed through a reference lens to the photosensitive drum; a sub-light guide part which includes a larger number of reflection mirrors than the reference light guide part and guides light emitted from the light source and passed through a sub-lens to the photosensitive drum; a reference holding structure which holds the reference lens and includes a reference reception part configured so as to be in contact with the reference lens deflected in a sub-scanning direction perpendicular to a main scanning direction; a sub-holding structure which holds the sub-lens, and includes a sub-reception part configured so as to be in contact with the sub-lens deflected in the sub-scanning direction and a deflection adjustment mechanism which presses the sub-lens to adjust a deflection of the sub-lens, wherein the reference lens and the sub-lens are arranged such that a deflection direction of the reference lens with respect to the reference reception part coincides with a deflection direction of the sub-lens with respect to the sub-reception part, and when it is assumed that the reference lens and the sub-lens are not deflected, an absolute value of a smallest distance between the sub-reception part and the sub-lens is set to be equal to or larger than an absolute value of a smallest distance between the reference reception part and the reference lens.

In this case, when the reference lens and the sub-lens are deflected, the reference lens may be provided in a deflected state so as to be close to the reference reception part, and the sub-lens may be provided in a deflected state so as to be close to the sub-reception part.

In this case, the housing may have a bottom portion and a top portion facing each other in the sub-scanning direction, the reference reception part is provided so as to be in contact with a center portion of the reference lens in the main scanning direction on a side closer to the bottom portion, the reference holding structure includes: a pair of reference support parts which supports both end portions of the reference lens in the main scanning direction; and a pair of reference biasing members which presses the reference lens on the pair of reference support parts, the sub-reception part and the deflection adjustment part are provided so as to in contact with a center portion of the sub-lens in the main scanning direction on a side closer to the top portion, and the sub-holding mechanism includes: a pair of sub-support parts which is provided on an opposite side to the deflection adjustment mechanism across the sub-lens and supports both end portions of the sub-lens in the main-scanning direction; a pair of sub-biasing members which presses the sub-lens on the pair of sub-support parts; and a pressing member which presses the sub-lens in a direction opposite to a pressing direction of the deflection adjustment part.

In this case, the sub-lens may have a protrusion protruding along an optical axis, the sub-reception part may be a groove formed in a holder which holds the sub-lens, and the protrusion may be engaged with the sub-reception part in a movable manner in the scanning direction.

An image forming apparatus of the invention includes the optical scanning device.

Effects of the Invention

According to the present invention, the shapes of the plurality of scanning light beams can be easily adjusted by adjusting the deflection of the sub-lens by the deflection adjustment mechanism with the light beam incident on the reference light guide part as a reference. Further, since it becomes possible to deflect the sub-lens more than reference lens, the deflection of the sub-lens can be properly adjusted with the reference lens as the reference.

BRIEF DESCRIPTION OF THE DRAWINGS

FIG. 1 is a front view schematically showing an inner structure of an image forming apparatus according to one embodiment of the present invention.

EMBODIMENT FOR CARRYING OUT THE INVENTION

Figure 2:
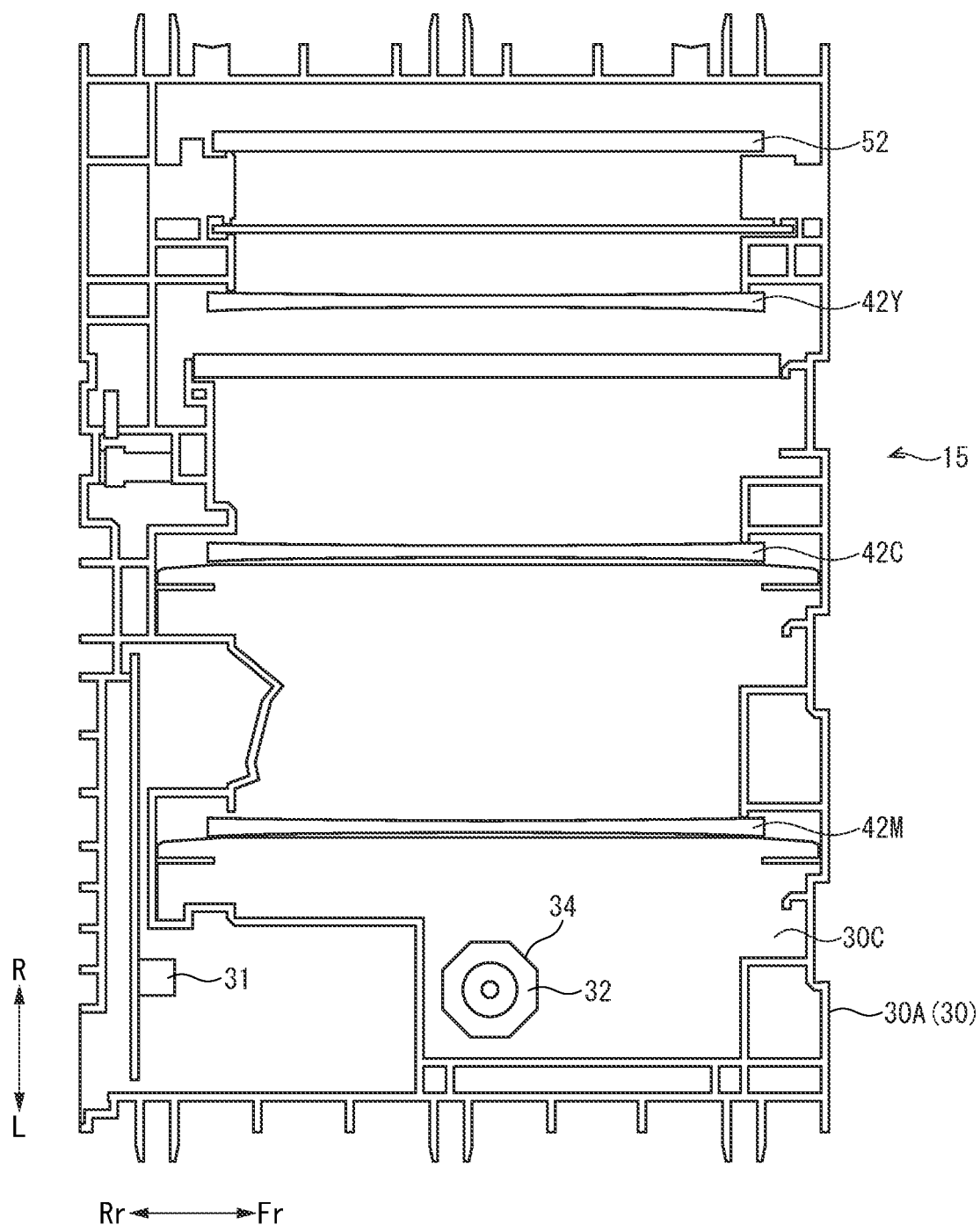
FIG. 2 is a plan view showing an inner structure of an optical scanning device according to the embodiment of the present invention.

Hereinafter, with reference to the attached drawings, a preferred embodiment of the present invention will be described. The reference numerals Fr, Rr, L, R, U, and D in the drawings indicate front, rear, left, right, upper, and lower. Although the terms used in the specification refer to directions and positions, these terms are used for convenience for explanation and do not limit the scope of the invention.

With reference to FIG. 1, an image forming apparatus 1 according to a first embodiment will be described. FIG. 1 is a front view schematically showing the inner structure of the image forming apparatus 1.

The image forming apparatus 1 is a color printer which forms a full-color toner image in an electrophotographic method, transfers it to a sheet P and forms an image. The image forming apparatus 1 includes an apparatus main body 2 constituting a substantially rectangular parallelepiped external appearance. In the lower portion of the apparatus main body 2, a sheet feeding cassette 3 in which the sheet S is stored is detachably provided, and on the upper surface of the apparatus main body 2, a sheet discharge tray 4 on which the sheet P having the image is stacked is provided. Below the discharge tray 4, four toner containers 5 containing toner (developer) of four colors (magenta, cyan, yellow and black) for replenishment are detachably attached. Inside the apparatus main body 2, a conveyance path 6 along which the sheet P is conveyed from the sheet feeding cassette 3 to the discharge tray 4 is formed.

Inside the apparatus main body 2, a sheet feeding part 10, an image forming part 11, and a fixing part 12 are provided. The sheet feeding part 10 is provided at the upstream end of the conveyance path 6, and the fixing part 12 is provided at the downstream portion of the conveyance path 6. The image forming part 11 is provided on the conveyance path 6 between the sheet feeding part 10 and the fixing part 12.

The image forming part 11 includes an intermediate transfer belt 13, four drum units 14, and an optical scanning device 15. The intermediate transfer belt 13 is provided below the toner containers 5 and travels in the direction indicated by the arrow in FIG. 1. The four drum units 14 are arranged side by side in the left-and-right direction below the intermediate transfer belt 13, and the optical scanning device 15 is provided below the drum units 14. The four drum units 14 correspond to the magenta, cyan, yellow and black toners in order from left to right. Since the four drum units 14 have the same structure, one drum unit 14 will be described below.

The drum unit 14 includes a photosensitive drum 20, a charging device 21, a developing device 22, a primary transfer roller 23, a cleaning device 24, and a static eliminator 25. The photosensitive drum 20 as an example of an image carrier is driven to be rotated around an axis while coming into contact with the lower surface of the intermediate transfer belt 13. The charging device 21, the developing device 22, the primary transfer roller 23, the cleaning device 24, and the static eliminator 25 are arranged around the photosensitive drum 20 in the order of the image forming process. The primary transfer roller 23 faces the photosensitive drum 20 from the upper side across the intermediate transfer belt 13. A secondary transfer roller 26 is in contact with the right end of the intermediate transfer belt 13.

[Image Forming Process] The operation of the image forming apparatus 1 will be described. A controller (not shown) executes the image forming process based on image data input from an external terminal as follows.

The charging device 21 charges the surface of the photosensitive drum 20. The optical scanning device 15 exposes the photosensitive drum 20 in accordance with the image data, and forms an electrostatic latent image on the surface of the photosensitive drum 20. The developing device 22 develops the electrostatic latent image formed on the surface of the photosensitive drum 20 into a toner image by using the toner supplied from the toner container 5. The toner images of four colors carried on the four photosensitive drums 20 are primarily transferred sequentially to the intermediate transfer belt 13 by the primary transfer rollers 23 to which a primary transfer bias is applied. Thus, a full-color toner image is formed on the surface of the intermediate transfer belt 13.

The sheet feeding part 10 takes out the sheet P stored in the sheet feeding cassette 3 and feeds it to the conveyance path 6. The secondary transfer roller 26 to which a secondary transfer bias is applied secondarily transfers the toner image on the intermediate transfer belt 13 to the sheet P. Thus, the toner image is formed on the sheet P. The fixing part 12 thermally fixes the toner image on the sheet P. The sheet P having the image is discharged to the discharge tray 4. The cleaning device 24 removes the toner remaining on the surface of the photosensitive drum 20 after the primary transfer, and the static eliminator 25 irradiates the photosensitive drum 20 with charge elimination light to remove the charge remaining on the photosensitive drum 20.

Figure 3:
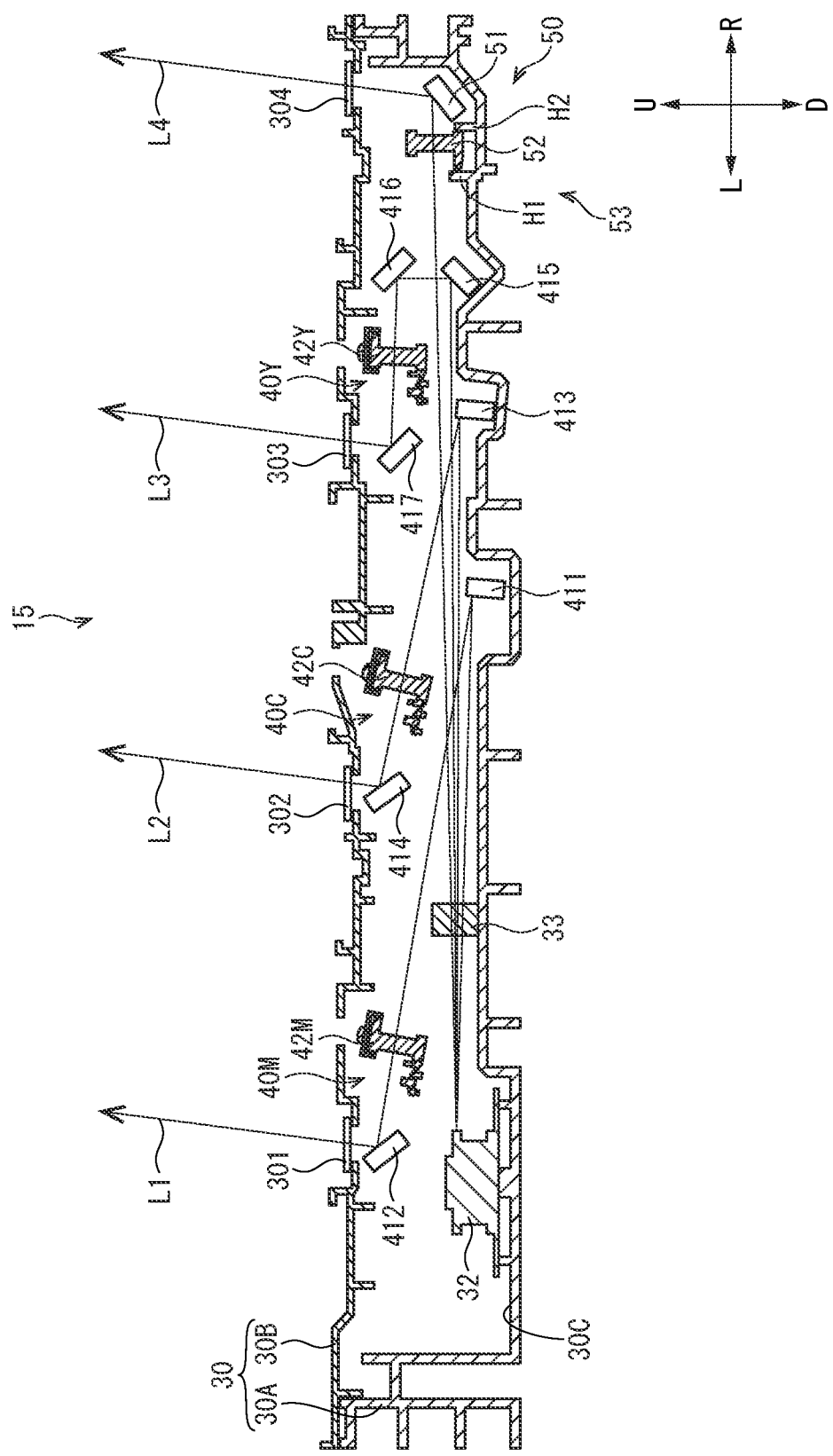
FIG. 3 is a sectional view showing the inner structure of then optical scanning device according to the embodiment of the present invention.

[Optical Scanning Device] Next, with reference to FIG. 2 and FIG. 3, the optical scanning device 15 will be described. FIG. 2 is a plan view showing the inner structure of the optical scanning device 15. FIG. 3 is a sectional view showing the inner structure of the optical scanning device 15.

The optical scanning device 15 exposes the four photosensitive drums 20 while moving a plurality of light beams along a main scanning direction and a sub scanning direction. As shown in FIG. 2 and FIG. 3, the optical scanning device 15 includes a housing 30, a light source 31, a polygon mirror 32, an fθ lens 33, a first sub-light guide part 40M, a second sub-light guide part 40C, a third sub-light guide part 40Y, and a reference light guide part 50. In this specification, for convenience of explanation, when the first sub-light guide part 40M, the second sub-light guide part 40C, and the third sub-light guide part 40Y are described in common, they are referred to as "sub-light guide part 40", and only arithmetic numerals are attached to the reference numeral. Further, when the sub-light guide part 40 and the reference light guide part 50 are described in common, they are referred to as "light guide parts 40 and 50".

<Housing> The housing 30 has a low rectangular parallelepiped external appearance, and supports each member of the optical scanning device 15. As shown in FIG. 3, the housing 30 has a housing body 30A having an upper opening, and a lid part 30B covering the opening of the housing body 30A. The housing body 30A has a bottom portion 30C disposed on the lower side (one side of a perpendicular direction). The lid part 30B constitutes a top portion disposed on the upper side (the other side of the perpendicular direction) facing the bottom portion 30C. The lid part 30B has a first emission port 301, a second emission port 302, a third emission port 303, and a fourth emission port 304 through which laser light are emitted toward the four photosensitive drums 20.

<Light Source, Polygon Mirror, and fθ LENS> As shown in FIG. 2, the light source 31 is provided in the left rear side portion of the inside (on the bottom portion 30C) of the housing 30. The light source 31 emits the four laser beams irradiated on the four photosensitive drums 20. The polygon mirror 32 is supported on the left side portion of the inside (on the bottom portion 30C) of the housing 30 in a rotatable manner around an axis. The polygon mirror 32 is formed in a polygonal shape when viewed in a plan view, and reflecting surfaces 34 (deflecting surfaces) are formed on their side surfaces. The rotating polygon mirror 32 reflects the plurality of light beams emitted from the light source 31 on the reflecting surfaces 34.

As shown in FIG. 3, the fθ lens 33 is disposed on the downstream side of the polygon mirror 32 in the optical path, and the plurality of light beams deflected by the polygon mirror 32 pass therethrough. The fθ lens 33 makes the laser beam reflected on the polygon mirror 32 at a constant angle scan the photoreceptor drum 20 at a constant angular velocity. In this specification, the laser beams with which the four photosensitive drums 20 are irradiated are referred to as the first light beam L1, the second light beam L2, the third light beam L3, and the fourth light beam L4 in order from left to right.

<Outline of Light Guide Part> As shown in FIG. 3, the first sub-light guide part 40M, the second sub-light guide part 40C, the third sub-light guide part 40Y, and the reference light guide part 50 are arranged in this order from the vicinity of the polygon mirror 32 toward the right side. The four light guide parts 40 and 50 are arranged between the fθ lens 33 and the four photosensitive drums 20 in the optical path, and guide the light deflected by the polygon mirror 32 to the four photosensitive drums 20. Specifically, the first sub-light guide part 40M exposes the magenta photosensitive drum 20, the second sub-light guide part 40C exposes the cyan photosensitive drum 20, the third sub-light guide part 40Y exposes the yellow photosensitive drum 20, and the reference light guide part 50 exposes the black photosensitive drum 20.

<First Sub-Light Guide Part> The first sub-light guide part 40M includes a first reflection mirror 411, a first sub-lens 42M, and a second reflection mirror 412. The first reflection mirror 411 is disposed on the bottom portion 30C of the housing body 30A, and reflects the first light beam L1 passing through the fθ lens 33 upward and leftward. The first sub-lens 42M is disposed on the optical path of the first light beam L1 reflected by the first reflection mirror 411 on the side closer to the lid part 30B. The second reflection mirror 412 is disposed on the side closer to the lid part 30B, and reflects the first light beam L1 passed through the first sub-lens 42M toward the upper photosensitive drum 20.

<Second Sub-Light Guide Part> The second sub-light guide part 40C includes a third reflection mirror 413, a second sub-lens 42C, and a fourth reflection mirror 414. The third reflection mirror 413 is disposed on the bottom portion 30C of the housing body 30A, and reflects the second light beam L2 passed through the fθ lens 33 upward and leftward. The second sub-lens 42C is disposed on the optical path of the second light beam L2 reflected by the third reflection mirror 413 on the side closer to the lid part 30B. The fourth reflection mirror 414 is disposed on the side closer to the lid part 30B, and reflects the second light beam L2 passed through the second sub-lens 42C toward the upper photosensitive drum 20.

<Third Sub-Light Guide Part> The third sub-light guide part 40Y includes a fifth reflection mirror 415, a sixth reflection mirror 416, a third sub-lens 42Y, and a seventh reflection mirror 417. The fifth reflection mirror 415 is disposed on the bottom portion 30C of the housing body 30A, and reflects the third light beam L3 passed through the fθ lens 33 upward. The sixth reflection mirror 416 is disposed on the side closer to the lid part 30B, and reflects the third light beam L3 reflected by the fifth reflection mirror 415 leftward. The third sub-lens 42Y is disposed on the optical path of the third light beam L3 reflected by the sixth reflection mirror 416 on the side closer to the lid part 30B. The seventh reflection mirror 417 is disposed on the side closer to the lid part 30B, and reflects the third light beam L3 passed through the third sub-lens 42Y toward the upper photosensitive drum 20.

<Reference Light Guide Part> The reference light guide part 50 includes a reference lens 52 and an eighth reflection mirror 51. The reference lens 52 is disposed on the optical path of the fourth light beam L4 passed through the fθ lens 33 on the bottom portion 30C of the housing body 30A. The eighth reflection mirror 51 is disposed on the bottom portion 30C of the housing body 30A, and reflects the fourth light beam L4 passed through the reference lens 52 toward the upper photosensitive drum 20.

In this specification, for convenience of explanation, when the first sub-lens 42M, the second sub-lens 42C, and the third sub-lens 42Y are described in common, they are referred to as "sub-lens 42", and only arithmetic numerals are attached to the reference numeral. Further, when the sub-lens 42 and the reference lens 52 are described in common, they are referred to as "lenses 42 and 52". Further, the first to eighth reflection mirrors 411 to 417 are described in common, they are referred to as "reflection mirrors 41 and 51", and the reference numerals thereof are simplified.

As described above, the reference light guide part 50 includes one eighth reflection mirror 51, and each of the sub-light guide parts 40 includes two or more reflection mirrors 41 more than the reference light guide part 50. The reference light guide part 50 guides the light emitted from the light source 31 and passed through the reference lens 52 to the photosensitive drum 20, and the sub-light guide part 40 guides the light emitted from the light source 31 and passed through the sub-lens 42 to the photosensitive drum 20. The first light beam L1, the second light beam L2, the third light beam L3, and the fourth light beam L4 passed through the fθ lens 33 are arranged in this order from the bottom portion 30C side of the housing 30 toward the lid part 30B. That is, the first light beam L1 passes through the fθ lens 33 at a position closest to the bottom portion 30C, and the fourth light beam L4 passes through the fθ lens 33 at a position closest to the lid part 30B.

Figure 4:
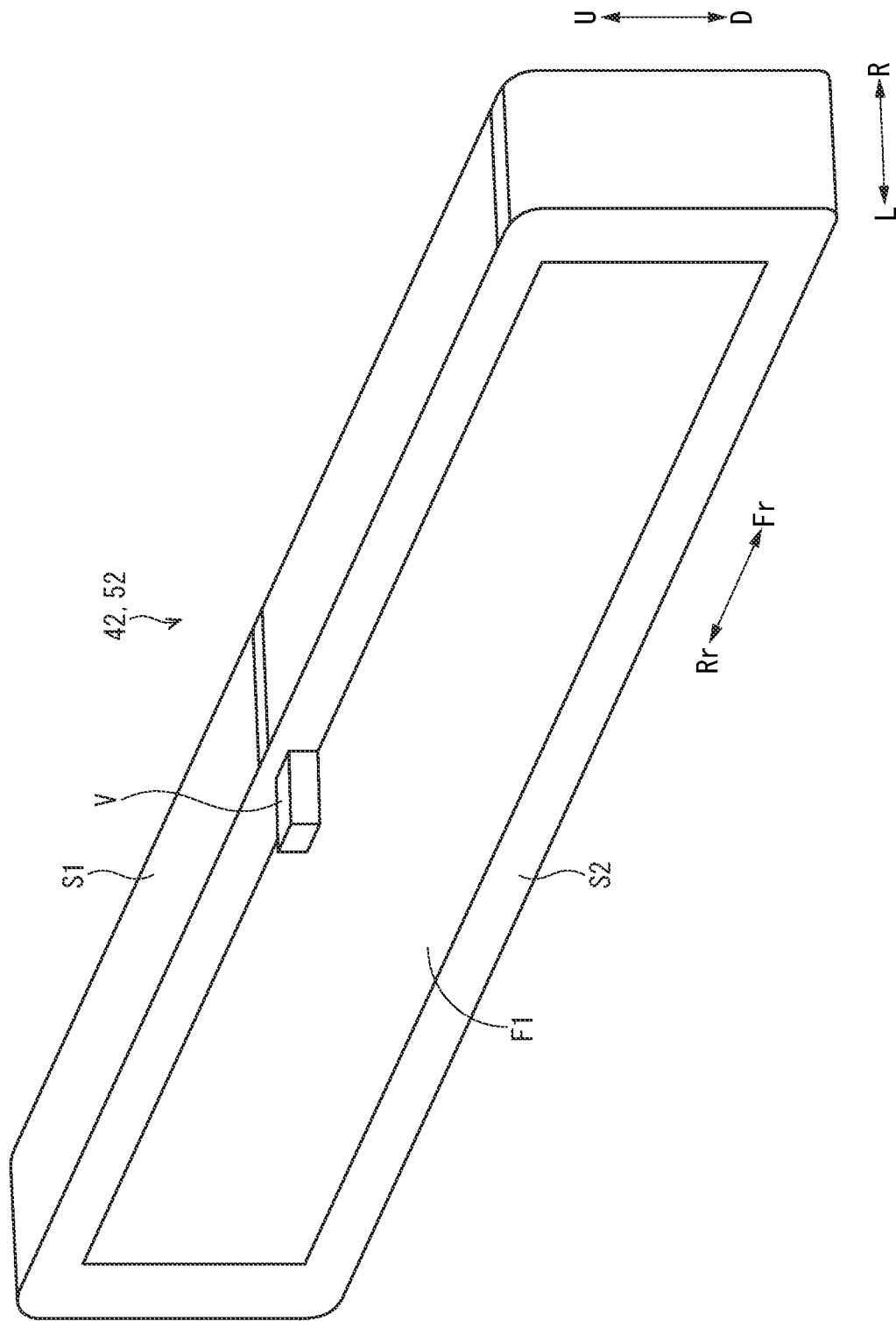
FIG. 4 is a perspective view showing a lens of the optical scanning device according to the embodiment of the present invention.

<Detailed Description of Lens> Next, with reference to FIG. 4, the lenses 42 and 52 will be described. FIG. 4 is a perspective view showing the lenses 42 and 52.

The three sub-lenses 42 and the reference lens 52 have the same shape for the purpose of cost reduction due to common use of parts. The lenses 42 and 52 are made of synthetic resin, for example. The lenses 42 and 52 are formed in a rod shape extending long in the front-and-rear direction (the main scanning direction). The lenses 42 and 52 are formed such that an incident surface F1 on which the light beam is incident and an emission surface (not shown) from which the light beam emits are opposed to each other in the left-and-right direction. The lenses 42 and 52 are formed such that a first side portion S1 and a second side portion S2 are opposed to each other in the upper-and-lower direction. The lenses 42 and 52 have a protrusion V protruding along the optical axis from the center portion of the first side portion S1 in the front-and-rear direction on the side of the incident surface F1.

Since the lenses 42 and 52 made of synthetic resin are manufactured using a mold or the like, they are often deflected (slightly curved) in the upper-and-lower direction (the sub-scanning direction crossing the main scanning direction), for example. The deflection direction (warpage direction) of the lenses 42 and 52 changes depending on the arrangement of the mold itself and the arrangement of the gate (the inlet of the molten synthetic resin) of the mold during manufacturing. Therefore, the deflection direction (the warpage direction) of the lenses 42 and 52 can be unified by unifying the arrangement of the molds and the like.

The sub-lens 42 and the reference lens 52 have different mounting structures to the housing 30. Mainly, the reference lens 52 is supported on the side closer to the bottom portion 30C of the housing 30, and the sub-lenses 42 are supported on the side closer to the top portion of the housing 30.

Figure 5:
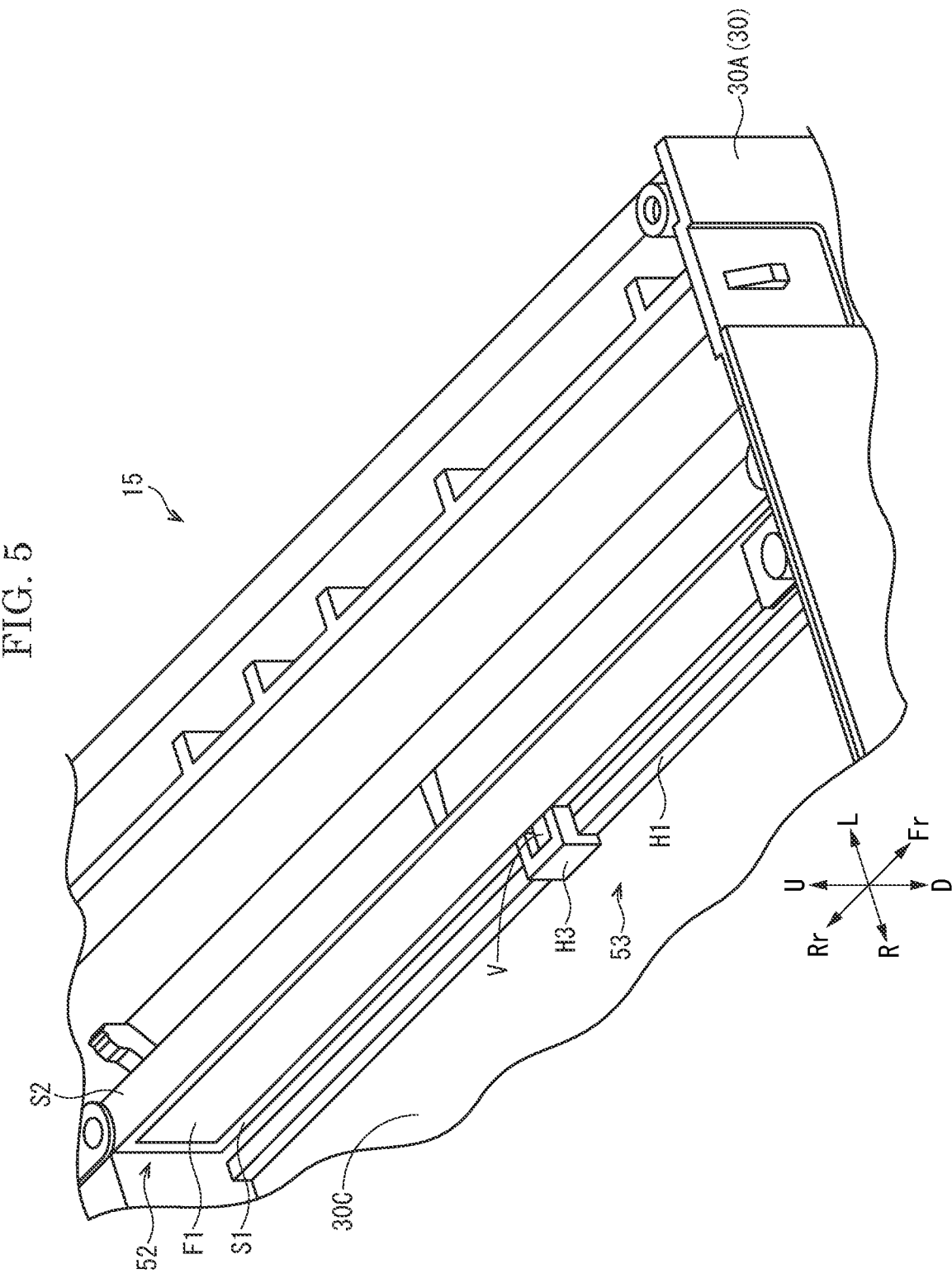
FIG. 5 is a perspective view showing a part of the inner structure of the optical scanning device according to the embodiment of the present invention.
Figure 6:
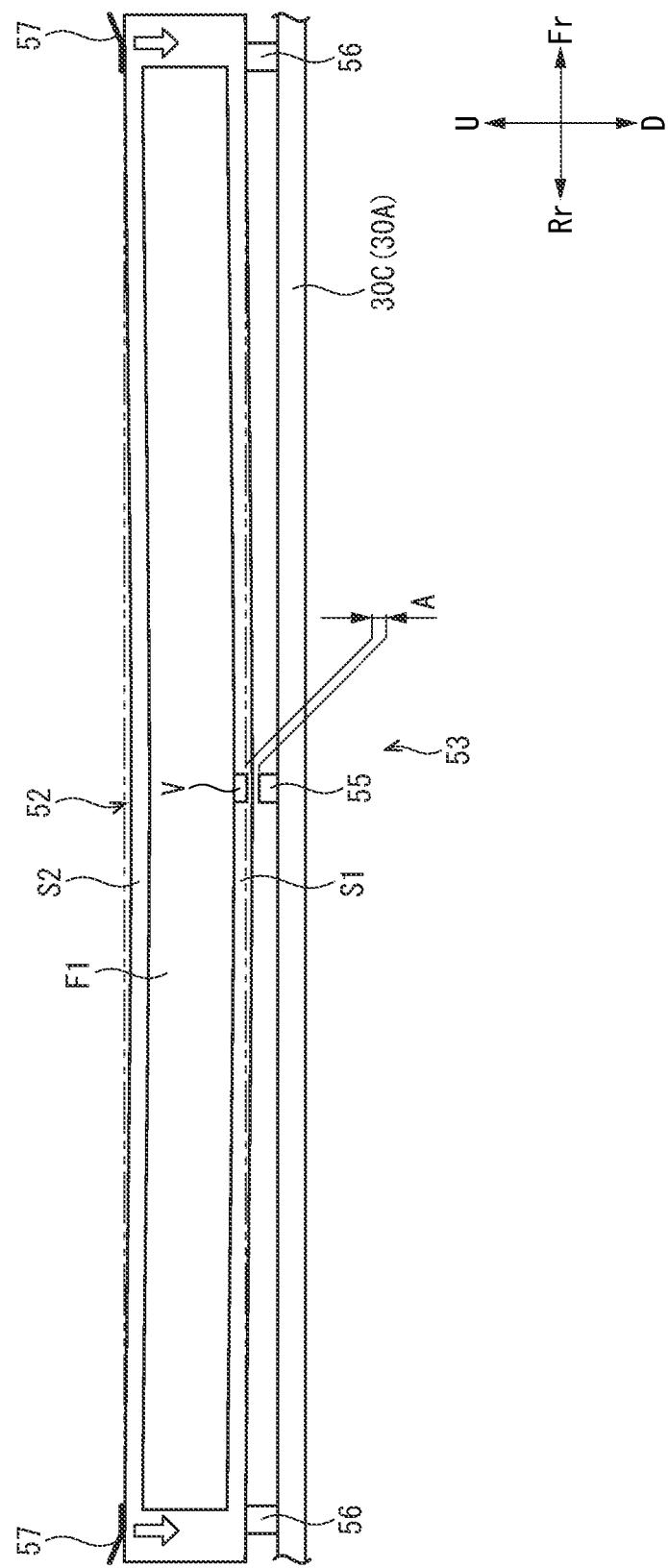
FIG. 6 is a side view schematically showing a reference lens and a reference holding structure in the optical scanning device according to the embodiment of the present invention.

<Reference Holding Structure> First, with reference to FIG. 3, FIG. 5 and FIG. 6, the reference holding structure 53 for holding the reference lens 52 will be described. FIG. 5 is a perspective view showing a part of the inner structure of the optical scanning device 15. FIG. 6 is a side view schematically showing the reference lens 52 and the reference holding structure 53.

As shown in FIG. 3 and FIG. 5, the reference holding structure 53 has a first upright wall H1, a second upright wall H2, and a central restriction portion H3. The first upright wall H1 and the second upright wall H2 protrude from the right portion of the bottom portion 30C of the housing body 30A. The central restriction portion H3 is formed at the center portion of the first upright wall H1 in the front-and-rear direction. The reference lens 52 is disposed between the first upright wall H1 and the second upright wall H2 in a posture in which the first side portion S1 faces the bottom portion 30C (a posture in which the lenses 42 and 52 in FIG. 4 are turned upside down). The protrusion V of the reference lens 52 is engaged with the central restriction portion H3 (see FIG. 5). The housing body 30A is provided with a pair of inner walls (not shown) coming into contact with both front and rear ends of the reference lens 52. The moving of the reference lens 52 in the front-and-rear direction is restricted by the central restriction portion H3 and the pair of inner walls.

As shown in FIG. 6, the reference holding structure 53 includes a reference reception part 55, a pair of reference support parts 56, and a pair of reference biasing members 57. The reference reception part 55 and the pair of reference support parts 56 are provided on the side closer to the bottom portion 30C of the housing 30, and the pair of reference biasing members 57 are provided on the side closer to the top portion of the housing 30.

<Reference Reception Part and Reference Support part> The reference reception part 55 and the pair of reference support parts 56 are protrusions protruding from the bottom portion 30C between the first upright wall H1 and the second upright wall H2. The reference reception part 55 is provided on the center portion of the bottom portion 30C in the front-and-rear direction, and the pair of reference support parts 56 are provided on both side portions of the bottom portion 30C in the front-and-rear direction. The pair of reference support parts 56 support (come in contact with) both end portions of the reference lens 52 (the first side portion S1) in the front-and-rear direction (the main scanning direction). The reference reception part 55 is formed to have a height lower than each reference support part 56.

(Reference Reception Part) As shown in FIG. 6, the reference lens 52 is disposed in a posture where the first side portion S1 faces the bottom portion 30C as described above, and is deflected so as to expand downward (toward the bottom portion 30C). The reference reception part 55 is provided so as to be in contact with the center portion of the reference lens 52 when the reference lens 52 is deflected to expand downward, for example. If the reference lens 52 is not deflected and extends straight in the front-and-rear direction (see the two-dot chain line in FIG. 6), the reference reception part 55 does not come in contact with the reference lens 52 (the first side portion S1), and a gap is formed between the reference lens 52 (the first side portion S1) and the reference reception part 55. When the deflection amount of the reference lens 52 is large, the reference reception part 55 comes into contact with the reference lens 52 (not shown) to restrict an increase in the deflection amount. When the deflection amount of the reference lens 52 is small, the reference reception part 55 may not come into contact with the reference lens 52 (a gap is formed as shown in FIG. 6).

(Reference Biasing Member) The pair of reference biasing members 57 are provided between both end portions of the second side portion S2 of the reference lens 52 in the front-and-rear direction and both end portions of the housing body 30A in the front-and-rear direction. The pair of reference biasing members 57 are formed by a plate spring, a coil spring, rubber or the like, for example, and press the reference lens 52 against the pair of reference support parts 56. The moving of the reference lens 52 in the upper-and-lower direction is restricted by the biasing force of the reference biasing members 57.

Figure 7:
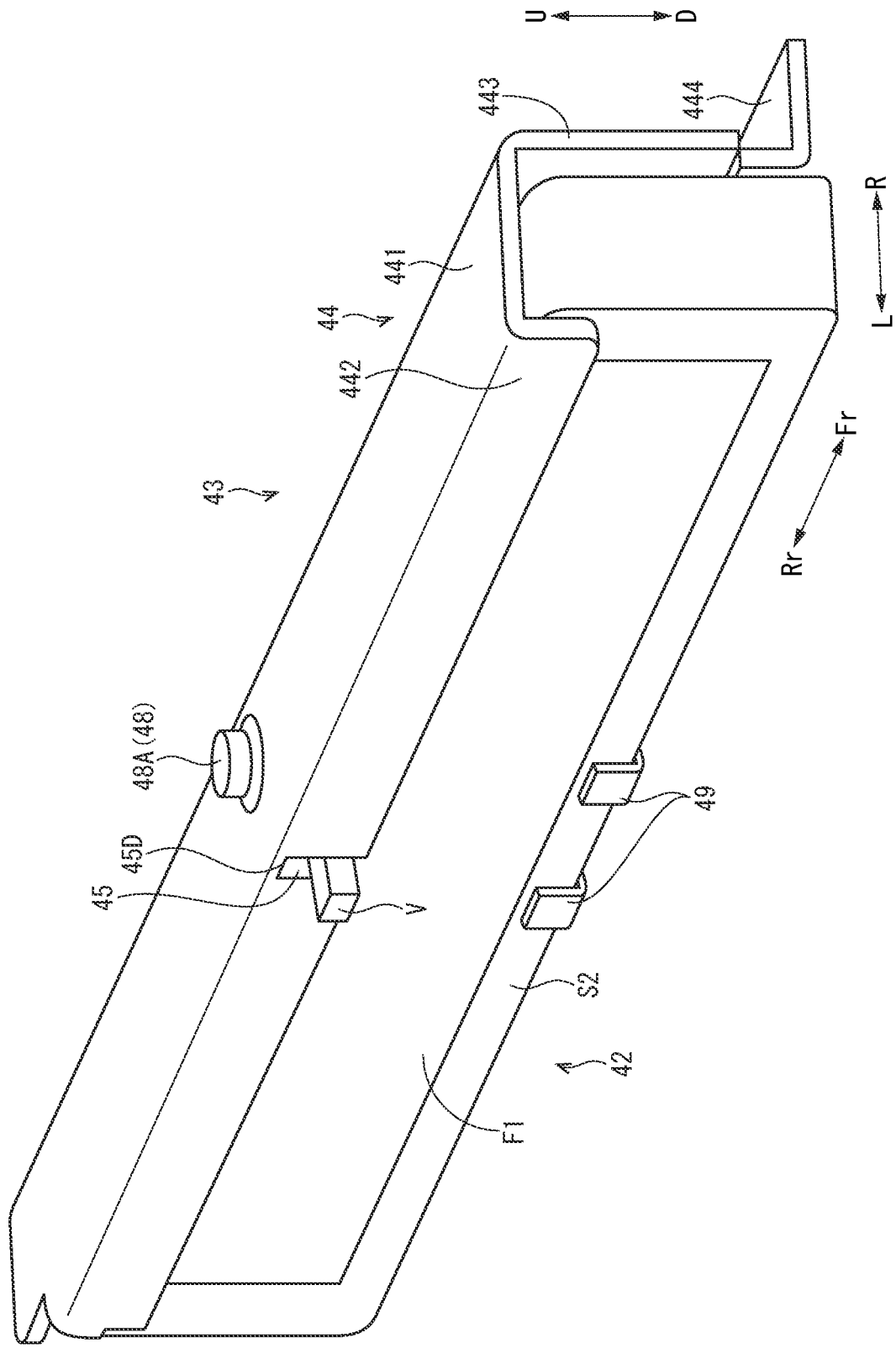
FIG. 7 is a perspective view showing a sub-lens held by a holder, in the optical scanning device according to the embodiment of the present invention.
Figure 8:
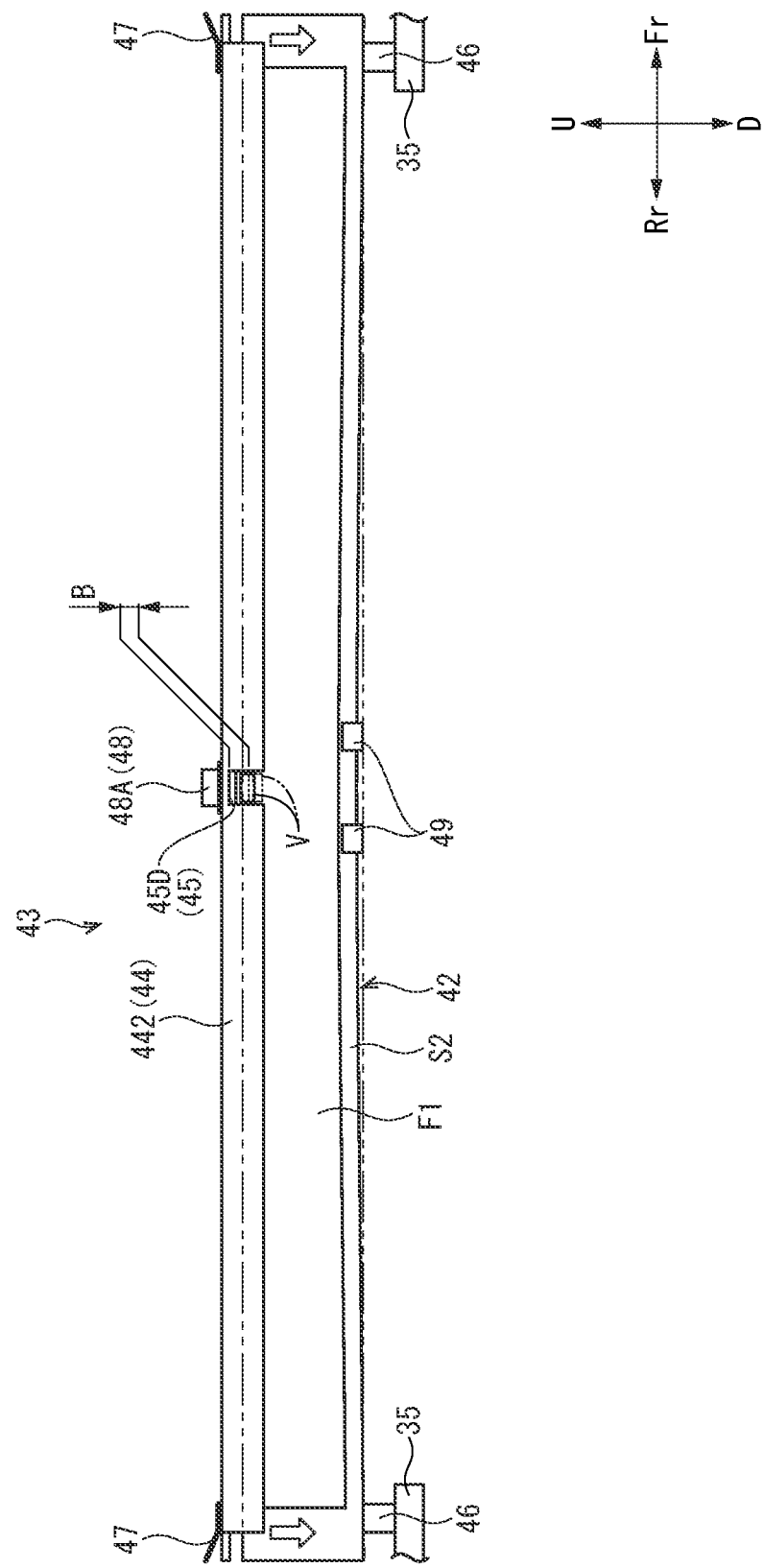
FIG. 8 is a side view schematically showing the sub-lens and a sub holding structure in the optical scanning device according to the embodiment of the present invention.

<Sub-Holding Structure> Next, with reference to FIG. 7 and FIG. 8, the sub-holding structure 43 for holding the sub-lens 42 will be described. FIG. 7 is a perspective view showing the sub-lens 42 held by the holder 44. FIG. 8 is a side view schematically showing the sub-lens 42 and the sub-holding structure 43. Since the three sub-holding structures 43 holding the first sub-light guide part 40M, the second sub-light guide part 40C and the third sub-light guide part 40Y have the same structure, one sub-holding structure 43 will be described below.

As shown in FIG. 7 and FIG. 8, the sub-holding structure 43 includes a holder 44, a sub-reception part 45, a pair of sub-support parts 46, a pair of sub-biasing members 47, a deflection adjustment mechanism 48, and a pressing member 49. The holder 44 holds the sub-lens 42 at a position separated from the bottom portion 30C to the side closer to the lid part 30B. The sub-reception part 45, the deflection adjustment mechanism 48 and the pair of sub-biasing members 47 are provided on the side closer to the top portion of the housing 30. The pair of sub-support parts 46 are provided on the opposite side to the deflection adjustment mechanism 48 with respect to the sub-lens 42.

(Holder) The holder 44 is formed by bending a sheet metal, for example. As shown in FIG. 7, the holder 44 has an upper surface portion 441, a pressing portion 442, a side surface portion 443, and a bent portion 444. The upper surface portion 441 covers the upper surface of the first side portion S1 of the sub-lens 42, and the pressing portion 442 extends downward from one end of the upper surface portion 441 and covers the upper portion (the first side portion S1) of the incident surface F1. The side surface portion 443 extends downward from the other end of the upper surface portion 441 and faces the emission surface of the sub-lens 42. The side surface portion 443 has an opening (not shown) through which the emission surface is exposed. The bent portion 444 extends outward from the lower end of the side surface portion 443. The holder 44 is fixed to the housing body 30A by screwing the bent portion 444 to the housing body 30A. The sub-lens 42 is held by the holder 44 in a posture in which the first side portion S1 faces the lid part 30B. The sub-lens 42 is supported by the housing body 30A with the holder 44.

(Sub-Reception Part) The sub-reception part 45 is a groove formed in the pressing portion 442 of the holder 44. The sub-reception part 45 is cut out upward from the lower end of the center portion of the pressing portion 442 in the front-and-rear direction (the main scanning direction). The protrusion V of the sub-lens 42 is engaged with the sub-reception part 45 in a movable manner in the upper-and-lower direction (the sub scamming direction). By engagement of the protrusion V with the sub-reception part 45, the moving of the sub-lens in the front-and-rear direction is restricted.

As shown in FIG. 8, the sub-lens 42 is disposed in a posture in which the first side portion S1 faces upward, and is deflected to expand upward, as described above. The sub-reception part 45 is provided so as to be in contact with the protrusion V (the center portion in the front-and-rear direction) of the sub-lens 42 when the sub-lens 42 expands upward, for example. Specifically, the protrusion V of the deflected sub-lens 42 often comes into contact with the deepest portion 45D of the sub-reception part 45 (the groove). If the sub-lens 42 is not deflected and extends straight in the front-and-rear direction (see the two-dot chain line in FIG. 8), the deepest portion 45D of the sub-reception part 45 does not come into contact with the protrusion V of the sub-lens 42, and a gap is formed between the deepest portion 45D of the sub-reception part 45 and the protrusion V. When the deflection amount of the sub-lens 42 is large, the deepest portion 45D of the sub-reception part 45 comes into contact with the protrusion V (not shown), and an increase in the deflection amount is restricted. When the deflection amount of the sub-lens 42 is small, the deepest portion 45D of the sub-reception part 45 sometimes does not come into contact with the protrusion V (a gap is formed as shown in FIG. 8).

(Sub-Support Part) The pair of sub-support parts 46 protrude from a pair of inner support walls 35 provided in both side portions of the housing body 30A in the front-and-rear direction. The pair of sub-support parts 46 support (come in contact with) both end portions of the second side portion S2 of the sub-lens 42 in the front-and-rear direction (the main scanning direction).

(Sub-Biasing Member) The pair of sub-biasing members 47 are provided between both end portions of the upper surface portion 441 of the holder 44 in the front-and-rear direction and both end portions of the housing body 30A (or the lid part 30B) in the front-and-rear direction. The pair of sub-biasing members 47 are formed by a plate spring, a coil spring, rubber or the like, for example, and press the sub-lens 42 held by the holder 44 against the pair of sub-support parts 46. The moving of the sub-lens 42 in the upper-and-lower direction is restricted by the biasing force of the sub-biasing members 47.

(Deflection Adjustment Mechanism) As shown in FIG. 7 and FIG. 8, the deflection adjustment mechanism 48 is provided on the center portion of the upper surface portion 441 of the holder 44 in the front-and-rear direction. The deflection adjustment mechanism 48 includes a screw hole (not shown) opened in the upper surface portion 441 of the holder 44, and an adjustment screw 48A having a male screw meshing with a female screw of the screw hole. The adjustment screw 48A penetrates the screw hole (the upper surface portion 441), and is provided so as to be in contact with the center portion of the sub-lens 42 (the first side portion S1) in the front-and-rear direction (the main scanning direction). When the adjustment screw 48A is screwed in, the tip end portion of the adjustment screw 48A presses the first side portion S1. When the adjustment screw 48A is turned in the pull-out direction, the pressing force to the first side portion S1 is reduced (released). By turning the adjustment screw 48A in the forward and reverse directions, the deflection of the lens 42 along the main scanning direction is adjusted. The reference holding structure 53 is not provided with a mechanism for adjusting the deflection of the reference lens 52.

(Pressing Member) The pressing member 49 is formed integrally with the holder 44. The pressing member 49 is a pair of plate springs extending from the lower end of the side surface portion 443 of the holder 44 in the direction opposite to the bent portion 444 (see FIG. 7). The pressing member 49 supports the lower portion (the second side portion S2) of the sub-lens 42, and restricts the detachment of the sub-lens 42 from the holder 44. The pressing member 49 presses the sub-lens 42 in the direction (upward) opposite to the pressing force by the deflection adjustment mechanism 48.

The pressing member 49 is a pair of leaf springs, but is not limited to this, and may be one (or more than three) leaf spring. Further, although the pressing member 49 is formed integrally with the holder 44, it is not limited to this, and it may be formed of a plate spring, a coil spring, a rubber or the like which is a member different from the holder 44 (not shown). For convenience of explanation, in the specification, the sub-reception part 45 and the reference reception part 55 are described in common, they are simply referred to as "reception parts 45 and 55".

(Gap between Lens and Reception Part) As described above, the four lenses 42 and 52 are manufactured so that the deflection directions (the warpage directions) are the same. In the optical scanning device 15 according to the present embodiment, as shown in FIG. 6 and FIG. 8, when the reference lens 52 and the sub-lens 42 are deflected, the deflection direction of the reference lens 52 with respect to the reference reception part 55 coincides with the deflection direction of the sub-lens 42 with respect to the sub-reception part 45. That is, the reference lens 52 and the three sub-lenses 42 are mounted to the housing 30 in a deflected (warped) posture in the same direction. Specifically, the reference lens 52 is provided in a deflected state so as to be close to the reference reception part 55, and the sub-lenses 42 are provided in a deflected state so as to be close to the sub-reception part 45.

As shown in FIG. 6 and FIG. 8, when it is assumed that the lenses 42 and 52 are not deflected (or the deflection amount is small) (see the two-dot chain line), a gap is formed between the reception parts 45 and 55 and the lenses 42 and 52. In this embodiment, the relationship between the size (distance) of the gap is defined between the reference lens 52 and the sub-lens 42. Specifically, when it is assumed that the reference lens 52 and the sub-lens 42 are not deflected, the absolute value of the shortest distance (B) between the sub-reception part 45 (the deepest portion 45D) and the sub-lens 42 (the protrusion V) is set to be larger than or equal to the absolute value of the shortest distance (A) between the reference reception part 55 and the reference lens 52 ($|A| \leq |B|$). In this embodiment, as an example, the absolute value of the shortest distance (B) is set larger than the absolute value of the shortest distance (A).

Figure 9:
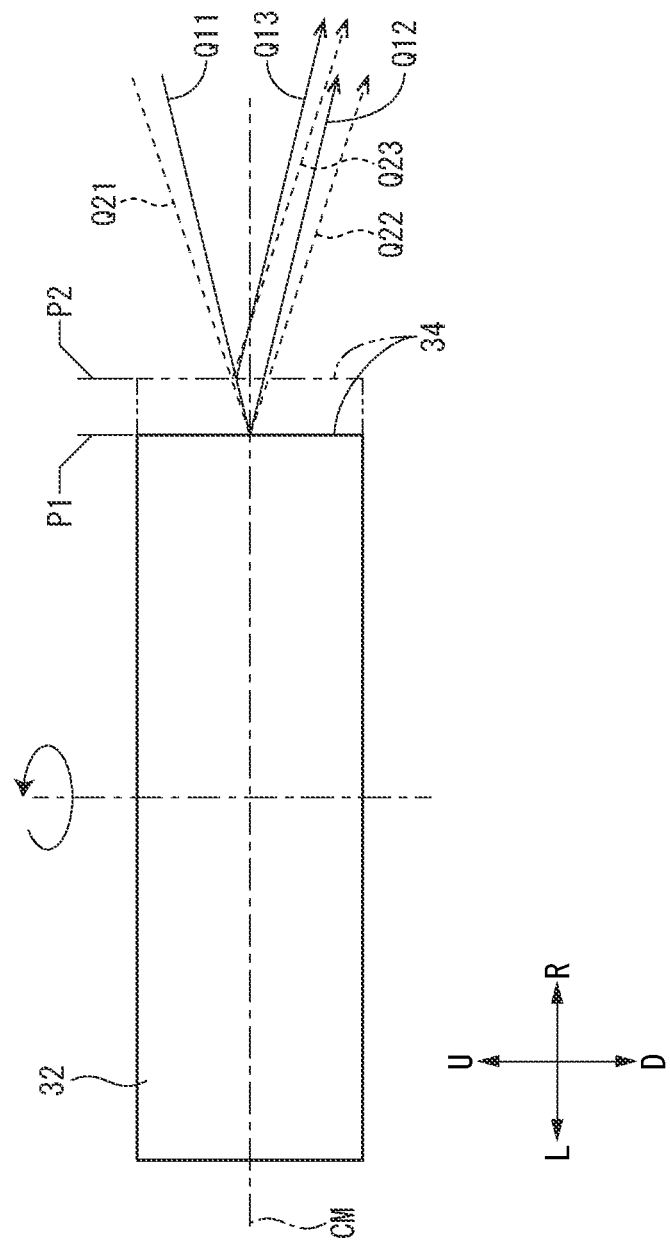
FIG. 9 is a view schematically explaining light deflected by a polygon mirror, in the optical scanning device according to the embodiment of the present invention.
Figure 10:
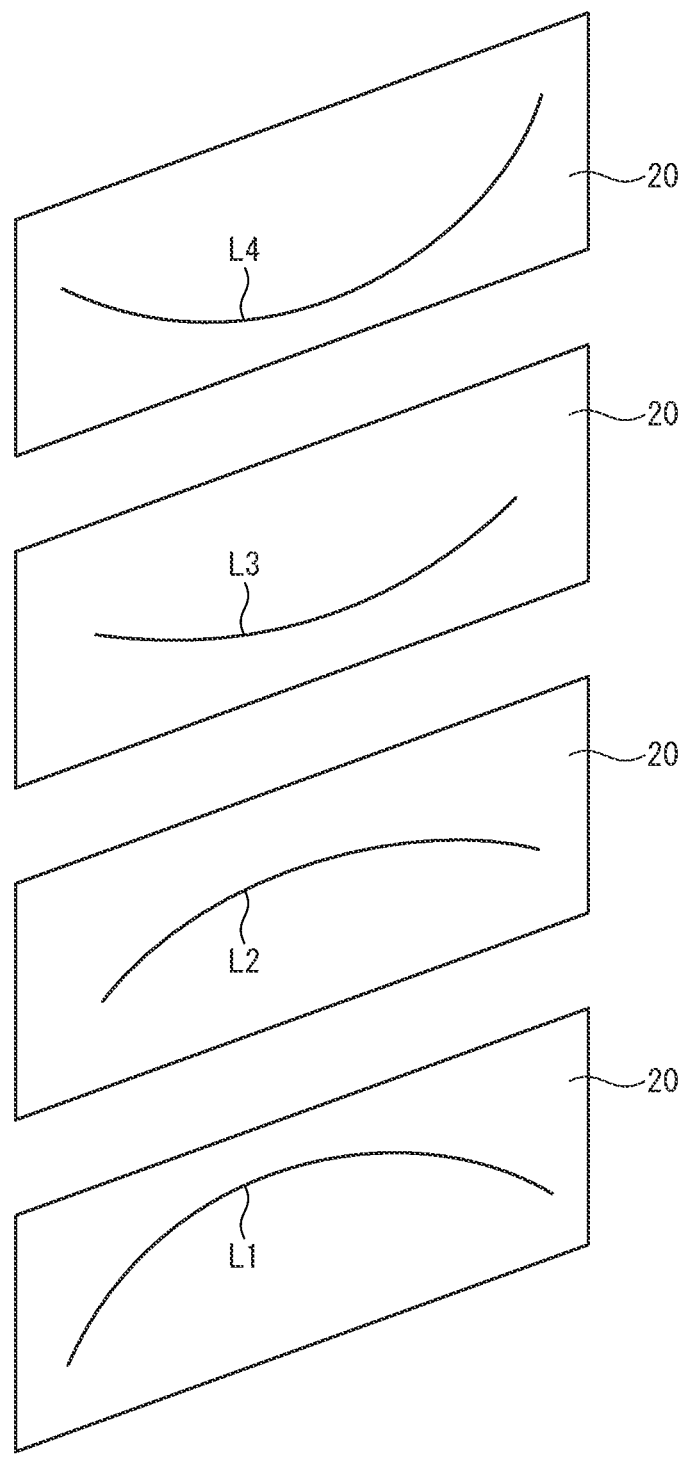
FIG. 10 is a view explaining deflection (bow) of scanning light on four photosensitive drums.

[Scanning Light on Photosensitive Drum] The scanning light on the photosensitive drum 20 will be described with reference to FIG. 9 and FIG. 10. FIG. 9 is a view schematically explaining light deflected by the polygon mirror 32. FIG. 10 is a view explaining a bending (bow) of the scanning light in the sub-scanning direction on the four photosensitive drums 20.

As shown in FIG. 9, the plurality of light beams emitted from the light source 31 are incident on the reflection surface 34 of the polygon mirror 32 at a predetermined acute angle (or an acute angle with respect to a surface perpendicular to the reflecting surface 34). The rotational locus of the outer circumferential edge of the reflection surface 34 shifts between P1 and P2 shown in FIG. 9. P1 corresponds to a minimum outer diameter of the polygon mirror 32, and P2 corresponds to a ridge line between the adjacent reflection surfaces 34. When the reflection surface 34 is located at P1, the incident light Q11 is reflected to be a reflection light Q12, and the incident light Q21 is reflected to be a reflection light Q22. On the other hand, when the reflection surface 34 is located at P2, the incident light Q11 is reflected to be a reflection light Q13, and the incident light Q21 is reflected to be a reflection light Q23. Therefore, as shown in FIG. 10, a bending (bow) of the scanning light in the sub-scanning direction occurs on each photosensitive drum 20.

The first light beam L1 and the second light beam L2 reflected by the reflection surface 34 travel below the surface center CM (see FIG. 9) of the reflection surface 34, and the third light beam L3 and the fourth light beam L4 reflected by the reflection surface 34 travel above the surface center CM of the reflection surface 34. Therefore, as shown in FIG. 10, a shape of the bow of the first light beam L1 and the second light beam L2 and a shape of the bow of the third light beam L3 and the fourth light beam L4 on the photosensitive drum 20 are linearly symmetrical with respect to the rotational axis of the photosensitive drum 20. Since the direction of the bow of the scanning light is reversed every time when the light is reflected by the reflection mirrors, the direction changes according to the number of the reflection mirrors.

In this embodiment, the first sub-light guide part 40M and the second sub-light guide part 40C are provided with two reflection mirrors, the third sub-light guide part 40Y is provided with three reflection mirrors, and the reference light guide part 50 is provided with one reflection mirror. In addition, the four lenses 42 and 52 have the same deflection direction (the warpage direction). Therefore, the directions of the bow of the four scanning lights are linearly symmetric as shown in FIG. 10. In FIG. 9, the larger the oblique incident angle of the incident light to the reflection surface 34, the larger the deflection amount (the warpage amount) of the bow on the photosensitive drum 20.

When the lenses 42 and 52 and the reflection mirrors 41 and 51 are fixed in an inclined posture with respect to the main scanning direction, an inclination (slew) occurs on the scanning light on the photosensitive drum 20. The bending and inclination of the scanning light causes a defective image such as a color shift.

In the optical scanning device 15 according to the embodiment described above, the reference lens 52 of the reference light guide part 50 is not provided with the deflection adjustment mechanism 48 (a mechanism for adjusting the bow of the scanning light along the sub-scanning direction on the photosensitive drum 20), and serves as a reference for the deflection adjustment of the other sub-lenses 42. Since the reference light guide part 50 has the smallest number of reflection mirrors compared with the other sub-light guide parts 40, the bending (bow) and the inclination (skew) occurred in the scanning light (the fourth light beam L4) on the photosensitive drum 20 owing to the weight and the inclination of the reflection mirror are smaller than those of the sub-light guide part 40. Therefore, when the fourth light beam L4 of the reference light guide part 50 serves as a reference and the deflection of the sub-lens 42 is adjusted by rotating the adjustment screws 48A in the forward or reverse direction, it becomes possible to adjust the shape of the four scanning lights easily. Further, the deflection adjustment mechanism 48 of the reference light guide part 50 can be omitted, and the manufacturing cost of the optical scanning device 15 can be reduced.

The deflection of the sub-lens 42 adjusted by the deflection adjustment mechanism 48 changes with the elapse of time (so-called creep phenomenon). The deflection amount of the sub-lens 42 due to the creep phenomenon increases as the adjustment amount (the deflection amount) of the sub-lens 42 is increased. For the problem caused by the creep phenomenon, in the optical scanning device 15 according to the present embodiment, when the four lenses 42 and 52 are deflected, the deflection directions (the warpage directions) of the four lenses 42 and 52 are made to be the same. According to this configuration, since the warping directions of the four lenses 42 and 52 are the same, the adjustment amount of only some sub-lenses 42 is not increased, and the adjustment amount of each sub-lens 42 can be minimized. Thus, the creep deformation of the adjusted sub-lens 42 can be reduced.

If the shortest distance (A) between the reference reception part 55 and the reference lens 52 is larger (longer) than the shortest distance (B) between the sub-reception part 45 (the deepest portion 45D) and the sub-lens 42 (the protrusion V), there is a possibility that the deflection of the sub-lens 42 cannot be fully adjusted by the deflection adjustment mechanism 48 with the fourth light beam L4 (the reference lens 52) as a reference. For the problem, in the optical scanning device 15 according to the present embodiment, the absolute value of the above-described shortest distance (B) is set to be equal to or larger than the absolute value of the above-described shortest distance (A) (|A|≤|B|) (see FIG. 6 and FIG. 8). According to this constitution, since the sub-lens 42 can be deflected more than the deflection of the reference lens 52, the deflection of the sub-lens 42 can be properly adjusted with the fourth light beam L4 (the reference lens 52) as a reference.

Further, according to the optical scanning device 15 of the present embodiment, since the sub-lens 42 is provided in a deflect state so as to be close to the sub-reception part 45, it becomes possible to restrict further increase of the deflection when the deflected sub-lens 42 come into contact against the sub-reception part 45. The deflection adjustment mechanism 48 presses the sub-lens 42 in the direction opposite to the deflection direction to adjust the deflection of the sub-lens 42 with the fourth light beam L4 (the reference lens 52) as a reference.

Further, in the optical scanning device 15 according to the present embodiment, since the sub-light guide part 40 is provided on the side closer to the top portion of the housing 30, the deflection adjustment mechanism 48 (the adjustment screw 48A) is exposed by detaching the lid part 30B. According to this configuration, the operator can easily operate the deflection adjustment mechanism 48 (the adjustment screw 48A). Further, since it is not necessary to adjust the deflection of the reference lens 52 (the reference holding structure 53) provided on the side closer to the bottom portion 30C of the housing 30, it is possible to easily adjust the deflection of the scanning light of the optical scanning device 15 as a whole. The adjustment hole may be formed in the lid part 30B so that the deflection can be adjusted without detaching the lid part 30B.

Further, according to the optical scanning device 15 of the present embodiment, since the protrusion V of the sub-lens 42 is engaged with the sub-reception part 45 in a movable manner in the upper-and-lower direction (the sub scanning direction), the moving of the sub-lens 42 at the time of deflection adjustment can be guided while positioning the sub-lens 42 in the main scanning direction. Since the protrusions V are disposed in the center portion of the lenses 42 and 52 in the main scanning direction, the positions of the protrusions V do not substantially change even if the lenses 42 and 52 are thermally expanded. Thereby, the deviation in the sub-scanning direction between the plurality of scanning lights can be reduced. Further, since the protrusions V are formed in the lenses 42 and 52, it becomes possible to discriminate between the incident surface F1 and the emission surface easily, and a mounting work of the lenses 42 and 52 can be easily carried out.

Figure 11:
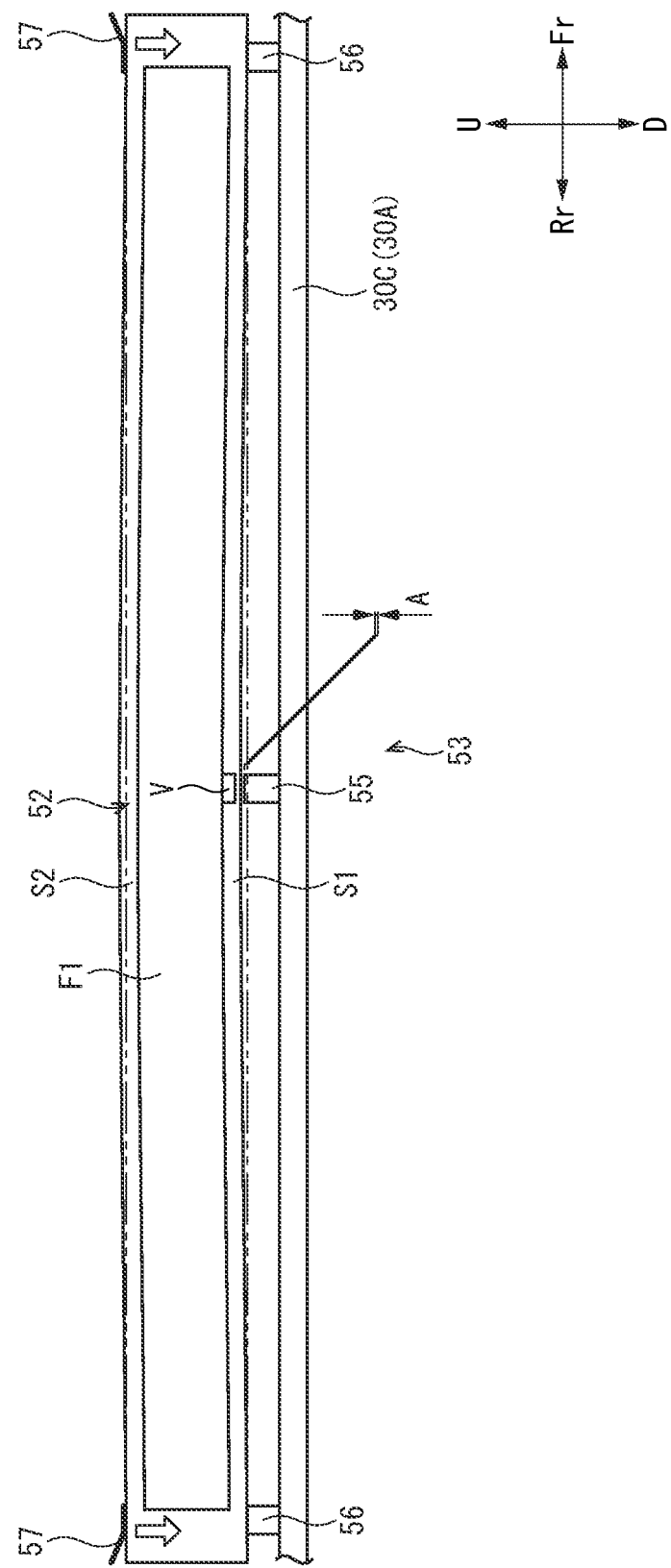
FIG. 11 is a side view schematically showing the reference lens and the reference holding structure in an modified example of the optical scanning device according to the embodiment of the present invention.
Figure 12:
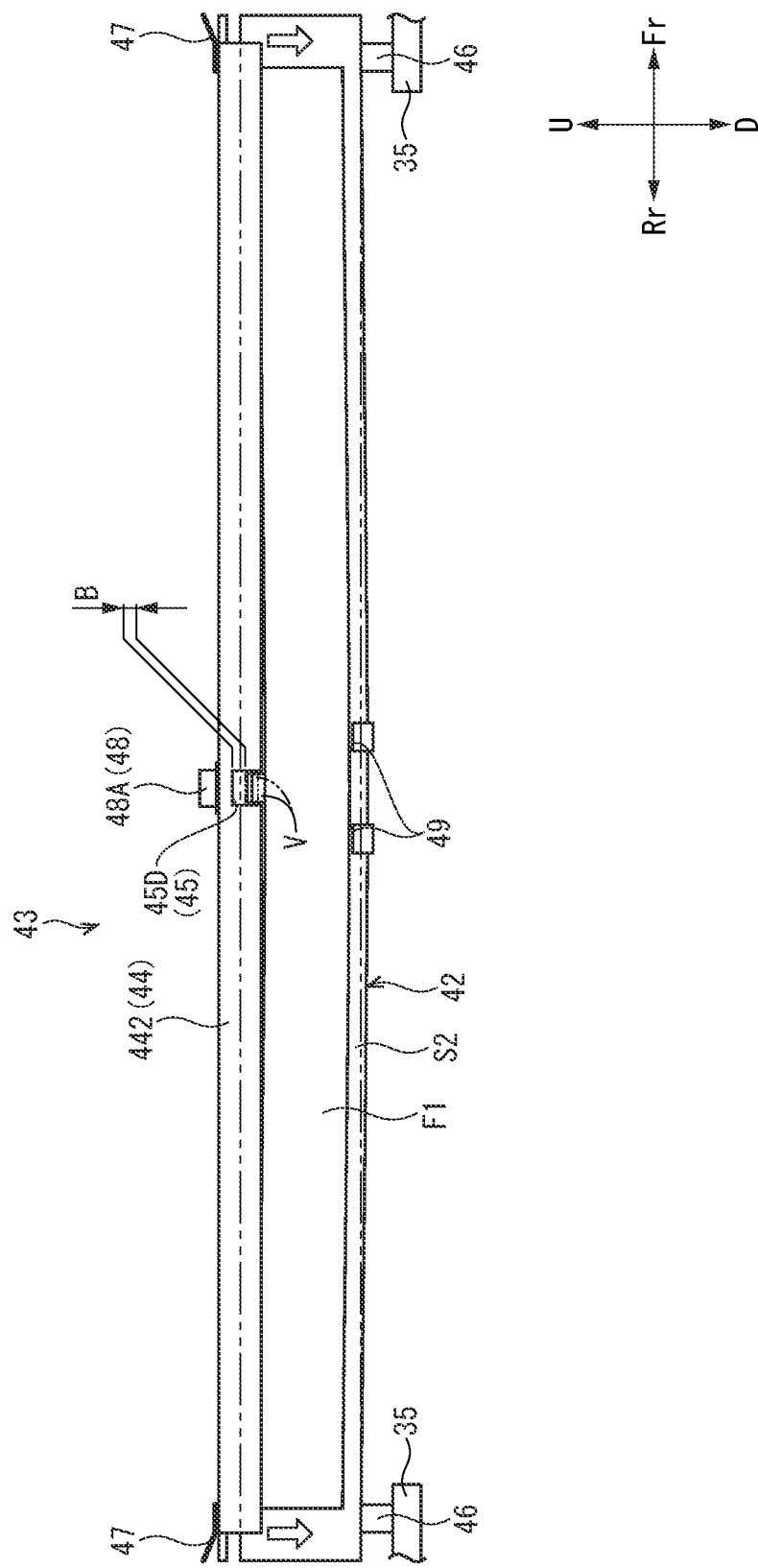
FIG. 12 is a side view schematically showing the sub-lens and the sub holding structure in the modified example of the optical scanning device according to the embodiment of the present invention.

In the optical scanning device 15 according to the present embodiment, the lenses 42 and 52 are provided in a deflect state so as to be close to the reception parts 45 and 55, but the present invention is not limited thereto. On the contrary, as shown in FIG. 11 and FIG. 12, as the optical scanning device 15 according to a modified example, the lenses 42 and 52 may be provided in a deflect state so as to be separated from the reception parts 45 and 55. Even in this case, when it is assumed that the lenses 42 and 52 are not deflected (see the two-dot chain line in FIG. 11 and FIG. 12), the absolute value of the above-described shortest distance (B) is set to be equal to or larger than the absolute value of the above-described shortest distance (A). Therefore, for example, as shown in FIG. 11, the reference reception part 55 may be higher than the reference support parts 56. In this case, when it is assumed that the reference lens 52 is not deflected, the reference reception part 55 bites into the reference lens 52, and the shortest distance (A) is a negative number. For example, as shown in FIG. 12, the deepest portion 45D of the sub-reception part 45 may be lower than the position shown in FIG. 8. Even in this case, when it is assumed that the sub-lens 42 is not deflected, the deepest portion 45D of the sub-reception part 45 may bite into the sub-lens 42, and the shortest distance (B) may become a negative number (not shown).

In the optical scanning device 15 according to the present embodiment (including the modified examples, and the same shall apply hereinafter), the protrusions V are formed in all the lenses 42 and 52, but it is not limited to this, and the protrusions V need only be formed in at least the sub-lens 42, and may not be formed in the reference lens 52.

Since the fourth light beam L4 travels farther away from the center of the fθ lens 33 than the third light beam L3, the bow (deflection amount) of the fourth light beam L4 is likely to be larger than the bow (deflection amount) of the third light beam L3 on the photosensitive drum 20 (see FIG. 10). Since the reference lens 52 is not provided with the deflection adjustment mechanism 48, the bow of the fourth light beam L4 is preferably made as small as possible.

The light guide parts 40 and 50 may be provided with a skew adjustment mechanism for adjusting the skew of the scanning light on the photosensitive drum 20. In this case, like the deflection adjustment mechanism 48, the skew adjustment mechanism may be provided on the sub-lens 42 but not on the reference lens 52. The first to seventh reflection mirrors 411 to 417 except the eighth reflection mirror 51 may be provided with the skew adjustment mechanism.

Figure 13:
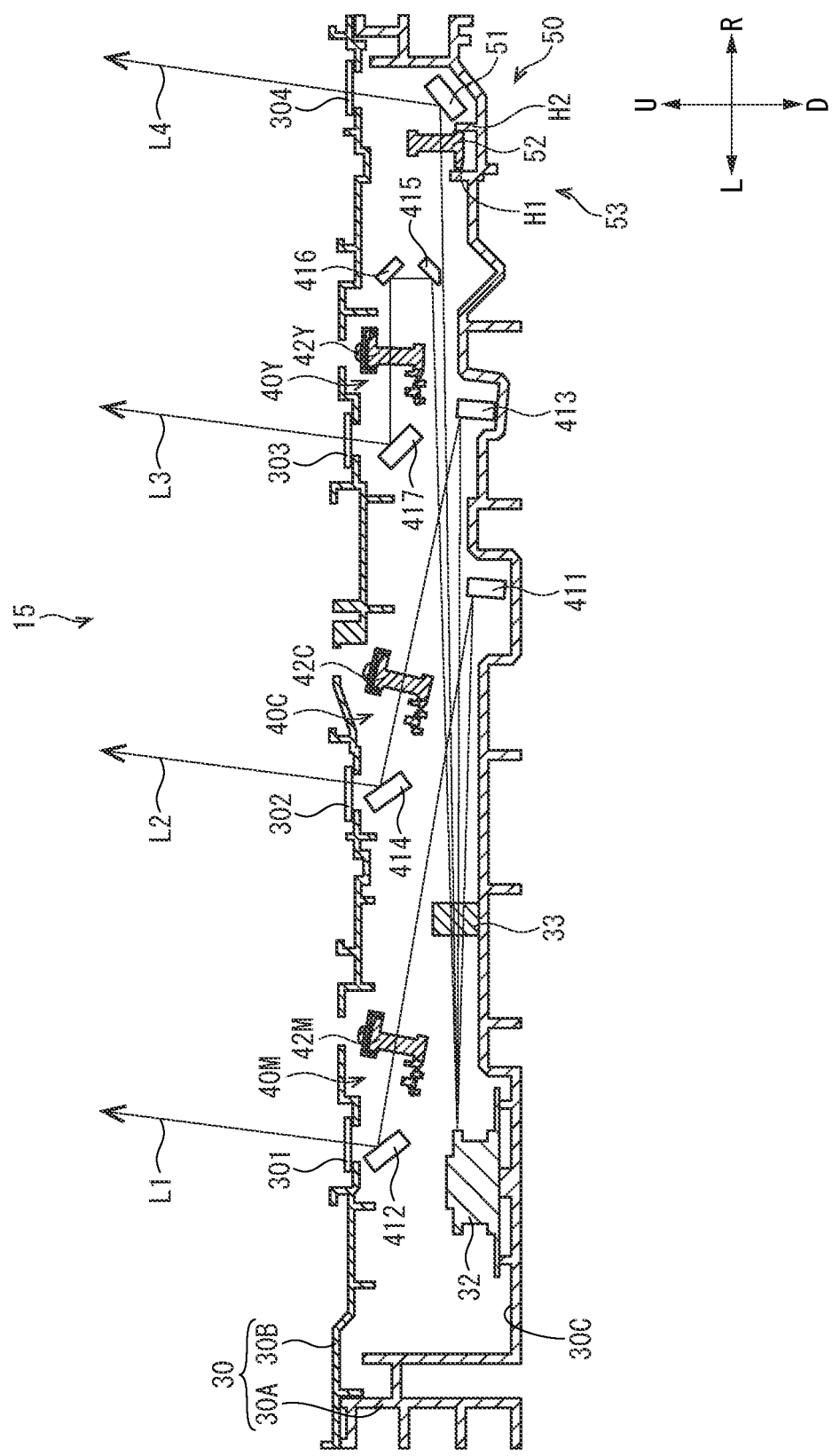
FIG. 13 is a sectional view showing the inner structure of the optical scanning device in another modified example of the embodiment of the present invention.

In the optical scanning device 15 according to the present embodiment, the lenses 42 and 52 and the reflection mirrors 41 and 51 are arranged as shown in FIG. 3, but the present invention is not limited thereto. For example, as shown in FIG. 13, as the optical scanning device 15 according to another modified example, the third sub-light guide part 40Y and the reference light guide part 50 are configured so that the fourth light beam L4 travels below the third light beam L3. The fifth reflection mirror 415 is disposed above the optical path of the fourth light beam L4, and is formed in a trapezoidal shape with its lower end cut out so as not to block the optical path of the fourth light beam L4.

In the optical scanning device 15 according to another modified example, the first light beam L1, the second light beam L2, the fourth light beam L4 and the third light beam L3 passing through the fθ lens 33 are arranged in this order from the side of the bottom portion 30C of the housing 30 toward the lid part 30B. Since the oblique incident angle (see FIG. 9) of the fourth light beam L4 to the reflection surface 34 of the polygon mirror 32 is smallest among the four light beams, the bow (the deflection amount) of the fourth light beam L4 on the photosensitive drum 20 can be reduced. Therefore, it can easily be used as a reference for adjusting the bow of the sub-light guide 40. In order to further reduce the deflection amount of the fourth light beam L4, the thickness of the eighth reflection mirror 51 may be larger than those of the other first to seventh reflection mirrors 411 to 417, or a reinforcing rib may be provided (not shown). In order to reduce the influence of the deflection of the eighth reflection mirror 51 on the bow of the fourth light beam L4 on the photosensitive drum 20, the angle of reflection of the fourth light beam L4 to the eighth reflection mirror 51 may be set small (not shown).

In the description of the present embodiment (including modified examples), a case where the present invention is applied to a color printer is shown as an example, but the present invention is not limited to this and may be applied to a monochrome printer, a copying machine, a facsimile machine or a multifunction machine, for example.

It should be noted that the description of the above embodiments shows one aspect of the optical scanning device and the image forming apparatus according to the present invention, and the technical scope of the present invention is not limited to the above embodiments. The invention may be variously changed, substituted, or modified without departing from the spirit of the technical idea, and the claims include all embodiments that may be included within the scope of the technical idea.

The invention claimed is:

1. An optical scanning device which exposes a plurality of photosensitive drums, the optical scanning device comprising:
a housing provided with a light source;
a reference light guide part which includes at least one reflection mirror, and guides light emitted from the light source and passed through a reference lens to the photosensitive drum;
a sub-light guide part which includes a larger number of reflection mirrors than the reference light guide part, and guides light emitted from the light source and passed through a sub-lens to the photosensitive drum;
a reference holding structure which holds the reference lens and includes a reference reception part configured so as to be in contact with the reference lens deflected in a sub-scanning direction perpendicular to a main scanning direction;
a sub-holding structure which holds the sub-lens, and includes a sub-reception part configured so as to be in contact with the sub-lens deflected in the sub-scanning direction and a deflection adjustment mechanism which presses the sub-lens to adjust a deflection of the sub-lens, wherein
the reference lens and the sub-lens are arranged such that a deflection direction of the reference lens with respect to the reference reception part coincides with a deflection direction of the sub-lens with respect to the sub-reception part, and
when it is assumed that the reference lens and the sub-lens are not deflected, an absolute value of a smallest distance between the sub-reception part and the sub-lens is set to be equal to or larger than an absolute value of a smallest distance between the reference reception part and the reference lens.

2. The optical scanning device according to claim 1, wherein
when the reference lens and the sub-lens are deflected, the reference lens is provided in a deflected state so as to be close to the reference reception part, and the sub-lens is provided in a deflected state so as to be close to the sub-reception part.

3. The optical scanning device according to claim 1, wherein
the housing has a bottom portion and a top portion facing each other in the sub-scanning direction,
the reference reception part is provided so as to be in contact with a center portion of the reference lens in the main scanning direction on a side closer to the bottom portion,
the reference holding structure includes:
a pair of reference support parts which is provided on a side closer to the bottom portion and supports both end portions of the reference lens in the main scanning direction; and
a pair of reference biasing members which presses the reference lens on the pair of reference support parts,
the sub-reception part and the deflection adjustment part are provided so as to in contact with a center portion of the sub-lens in the main scanning direction on a side closer to the top portion, and
the sub-holding mechanism includes;
a pair of sub-support parts which is provided on an opposite side to the deflection adjustment mechanism with respect to the sub-lens and supports both end portions of the sub-lens in the main-scanning direction;
a pair of sub-biasing members which presses the sub-lens on the pair of sub-support parts; and
a pressing member which presses the sub-lens in a direction opposite to a pressing direction of the deflection adjustment part.

4. The optical scanning device according to claim 3, wherein
the deflection adjustment part is an adjustment screw provided so as to be in contact with the center portion of the sub-lens in the main scanning direction, and is operatable through the top portion.

5. The optical scanning device according to claim 1, wherein
the sub-lens has a protrusion protruding along an optical axis,
the sub-reception part is a groove formed in a holder which holds the sub-lens, and
the protrusion is engaged with the sub-reception part in a movable manner in the scanning direction.

6. The optical scanning device according to claim 5, wherein
the protrusion is engaged with the sub-reception part in an unmovable manner in the main scanning direction.

7. The optical scanning device according to claim 3, further comprising:
a fθ lens which is disposed on the bottom portion between the light source, and the reference light guide part and the sub-light guide part, and on which the light emitted from the light source is incident, wherein
the light emitted from the light source toward the sub-light guide part passes through the fθ lens on a side closer to the bottom portion than the light emitted from the light source toward the reference light guide part.

8. An image forming apparatus comprising the optical scanning device according to claim 1.

* * * * *